April 5, 1960
I. WEINBERG
2,931,192
FISHING BOAT REFRIGERATION
Filed Nov. 15, 1957
2 Sheets-Sheet 1
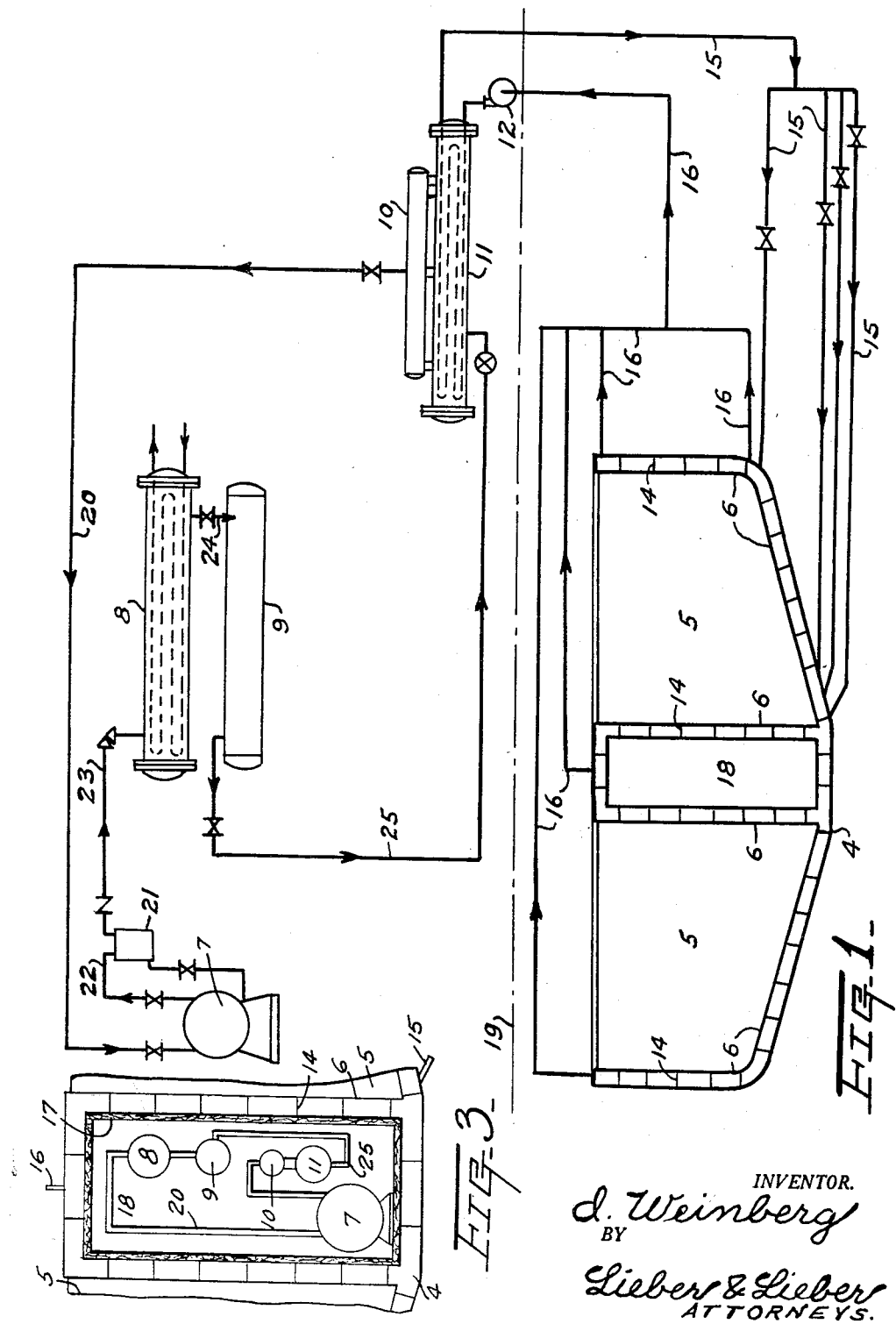
INVENTOR.
*I. Weinberg*
BY
*Lieber & Lieber*
ATTORNEYS.

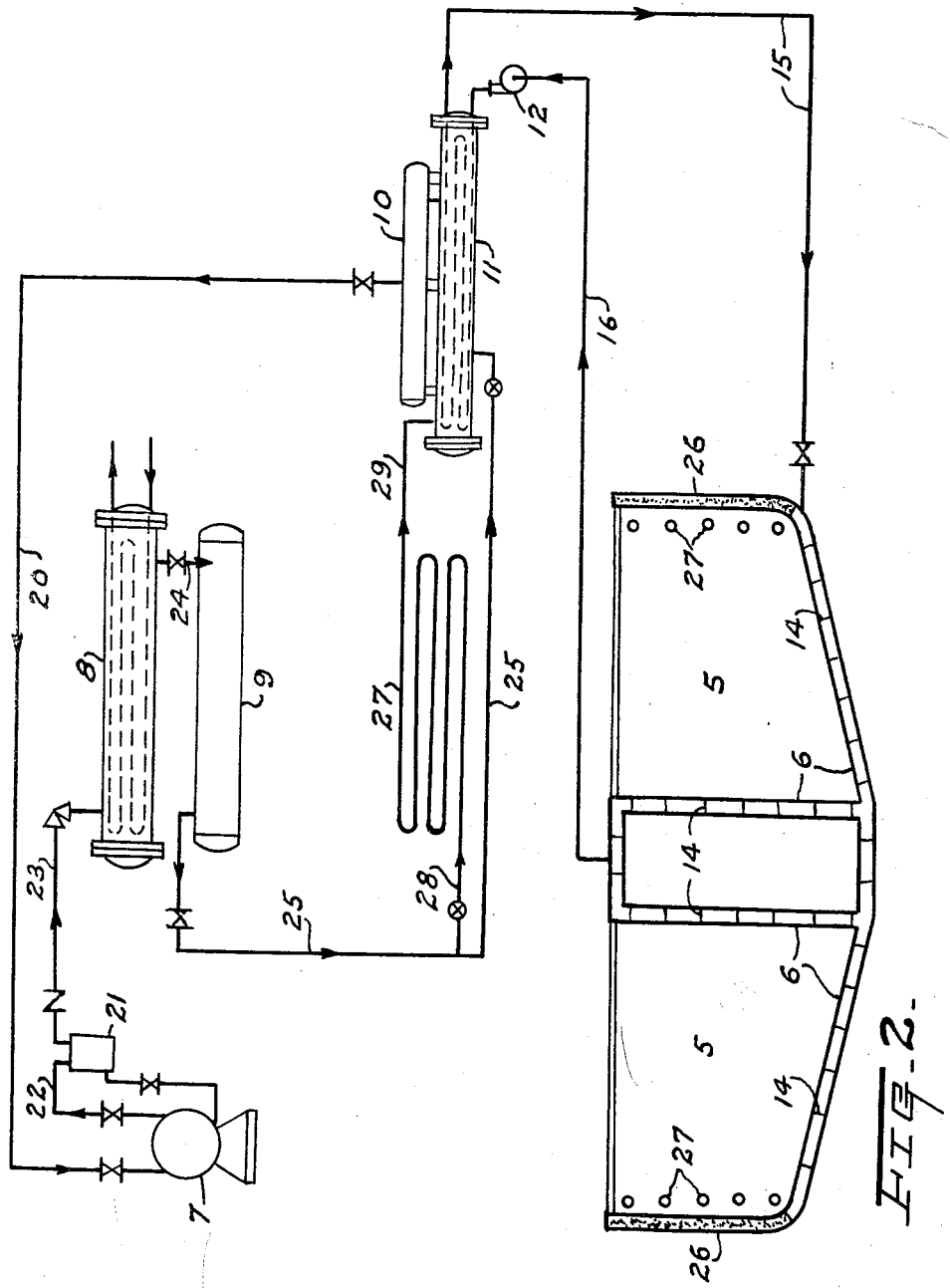

United States Patent Office 2,931,192
Patented Apr. 5, 1960

2,931,192
FISHING BOAT REFRIGERATION

Irving Weinberg, Atlanta, Ga., assignor to The Vilter Manufacturing Co., Milwaukee, Wis., a corporation of Wisconsin Application November 15, 1957, Serial No. 696,662

2 Claims. (Cl. 62—240)

This invention relates in general to improvements in the art of refrigeration, and it relates more specifically to an improved system for cooling the commodity storage space or compartments of fishing boats.

The primary object of the present invention is to provide an improved system for safely and effectively refrigerating the sea food confining and storage compartments of fishing boats in order to prevent spoilage of such commodity.

Since sea foods are subject to rapid deterioration when exposed to the atmosphere, it is essential to subject the same to refrigeration as quickly as possible after the catch, and to maintain such commodity effectively cooled until it can be unloaded from the boat. In order to maintain such sea foods in fresh and wholesome condition, it has heretofore been common practice to provide ordinary refrigerating systems involving volatile refrigerant circulating pipes located directly within the storage compartments of the boat hulls and to which the commodity was therefore directly exposed. While these prior cooling systems accomplished their intended food preservation purposes, they were highly objectionable primarily because the refrigerant circulating pipes would frequently burst due to rolling and weaving of the boats thus allowing obnoxious cooling gases to escape and contaminate the commodity, and secondarily because the circulating pipes obstructed and made it difficult to remove the cargo and to properly cleanse and sterilize the storage spaces when empty.

It is therefore an important more specific object of this invention to provide a simple fishing boat cooling system which obviates the above mentioned objectionable features of the prior systems, and which also possesses many other advantages thereover.

In accordance with the invention each sea food receiving and storage compartment of a fishing boat is primarily refrigerated by circulating cold anti-freeze liquid in proximity to one or more bounding walls thereof, and the anti-freeze solution is cooled by means of a system utilizing volatile refrigerant and of which none is, or only a small part may be, exposed directly to the commodity.

A clear conception of the features constituting the present improvement, and of the construction and functioning of several fishing boat refrigeration systems embodying the invention, may be had by referring to the drawings accompanying and forming a part of this specification wherein like reference characters designate the same or similar parts in the several views.

Fig. 1 is a diagram of a commercial fishing boat storage compartment refrigeration system wherein the compartment is cooled entirely by the circulation of cold anti-freeze solution through a smooth surface jacket bounding the same, a transverse section having been taken through the hull of the boat at the commodity confining space;

Fig. 2 is a similar diagram of a modified system wherein the storage space is cooled primarily by anti-freeze solution which is circulated through a smooth surfaced bounding jacket, and secondarily by means of a volatile refrigerant circulating coil disposed within and adjacent to one side of the cooling compartment; and Fig. 3 is a slightly enlarged diagrammatic transverse vertical section through the condensing unit housing space of the hull, showing the approximate location of the compressor, condenser, receiver, glycol chiller, and accumulator of the refrigeration system within this space.

While the invention has been shown and described herein as having been embodied in fishing boat refrigeration systems utilizing anti-freeze solutions such as glycol and volatile refrigerant such as ammonia, it is not intended to limit the improvements to the use of such specific cooling agents; and it is also contemplated that specific descriptive terms employed herein be given the broadest possible interpretation consistent with the actual disclosure.

Referring to Fig. 1 of the drawings, the fishing boat refrigeration system depicted diagrammatically therein, comprises in general a vessel or boat having its hull 4 provided with a pair of sea food storage compartments 5 each bounded glycol or other anti-freeze solution confining jackets 6 along its opposite sides and bottom; a glycol cooling unit including a volatile refrigerant or ammonia compressor 7, a refrigerant gas condenser 8, a liquid refrigerant receiver 9, and a suction accumulator 10; and a glycol chiller 11 adapted to be cooled by volatile liquid ammonia derived from the receiver 9 and cooperating with a pump 12 to circulate cold glycol through the jackets 6.

The outer walls of the jackets 6 are preferably covered with heat insulation, while the inner walls which are exposed to the compartments 5 are formed of good heat conducting material and present smooth and unobstructed surfaces to the commodity storage spaces. The interiors of these jackets 6 are provided with baffles 14, and the opposite ends of the successive baffles are provided with openings so as to produce circuitous passages through which the cooled glycol can flow from the supply pipes 15 which communicate with the delivery end of the glycol chiller 10 to the discharge pipes 16 which lead to the pump 12 and from thence to the chiller inlet.

The food storage compartments 5 may be separated by an intervening space 18 located at the center of the hull 4 and within which all of the elements of the glycol cooling and refrigeration units above the dot-and-dash line 19 may be confined, as depicted in Fig. 3, and the adjacent jacket 6 is preferably shielded from this space 18 by a layer or wall 17 of insulation. The inlet of the compressor 7 is connected with the accumulator 10 by a suction line 20 while the compressor discharge communicates with an oil separator 21 through a pipe line 22, and the separator 21 has an oil return pipe connected to the crank case of the compressor 7. The refrigerant outlet of the oil separator is connected to the condenser 8 by a pipe line 23, and this condenser has a discharge pipe line 24 for condensed liquid refrigerant leading into the receiver 9 which communicates with the glycol chiller 11 through another pipe line 25.

All of the glycol conducting pipes and the refrigerant conducting pipes are provided with suitable valves for properly controlling the flow of the respective fluids therethrough, and when the system shown in Fig. 1 has been properly constructed and installed as described, its operation is as follows. When a catch of sea food such as fish or shrimp is deposited within the compartments 5 through the usual hatches at the top of these confining spaces, the refrigerant compressor 7 and the glycol circulating pump 12 should be operated and the various control valves should be adjusted or manipulated to insure proper functioning. The compressor 7 will then constantly withdraw ammonia gas from the accumulator 10 through the pipe line 20 and will deliver the compressed refrigerant through the pipe line 22, oil separator 21 and pipe line 23 and past a non-return check valve in the latter, into the condenser 8 wherein the ammonia gas is liquified. The liquid ammonia is then delivered through the pipe line 24 into the receiver 9 from which it flows in regulated quantities through the pipe line 25 into the chiller 11.

The pump 12 constantly withdraws anti-freeze glycol from the jackets 6 through the pipes 16 and delivers the same into the chiller 11 wherein the anti-freeze solution is subjected to the cooling action of the liquid refrigerant which is gasified and discharged into the accumulator 10. The cooled glycol is then delivered through the pipes 15 and is constantly circulated through the jackets 6 thereby effectively cooling or refrigerating the contents of the sea food confining chambers 5. This cooling action is continuous and automatic after the various control valves have been properly initially set or adjusted.

This indirect cooling system provides entirely unobstructed sea food storage chambers from which the commodity can be easily removed, and which may be readily cleansed and sterilized due to the smooth internal bounding surfaces of the jackets 6. The cooling surfaces may extend along all of the sides and bottom of each compartment 5 thus providing an extensive cooling area, and the refrigerating unit can be controlled with simple valves without producing superheat or back flow of refrigerant from the chiller to the compressor while the chiller 11 may be located close to the compressor so as to reduce the length of the pipes to a minimum and thus reduce lines losses. The various components of the refrigerating and cooling units can be readily housed and sealed from the chambers 5 within a small space 18 disposed within the center of the hull 4 thus also providing added ballast for the vessel where it is most effective.

Referring to Fig. 2 of the drawings, the modified fishing boat refrigeration system illustrated therein, comprises in general a vessel or boat having its hull 4 provided with a pair of sea food storage compartments 5 each bounded by a glycol or other anti-freeze solution confining jacket 6 along its inner side and bottom while its outer wall 26 is heat insulated; a glycol cooling unit including a volatile refrigerant or ammonia compressor 7, a refrigerant gas condenser 8, a liquid refrigerant receiver 9, a direct expansion refrigerating coil 27 for each compartment 5, and a suction accumulator 10; and a glycol chiller 11 adapted to be cooled by volatile liquid ammonia derived from the receiver 9 and cooperating with a pump 12 to circulate cold glycol through the jackets 6.

Besides the insulated outer walls 26, each compartment jacket 6 has its outer bounding wall heat insulated, but the inner bounding walls of these jackets should be formed of good heat conducting material and present smooth and unobstructed surface to the adjacent commodity confining spaces. The interiors of the jackets 6 are also provided with baffles 14 forming circuitous passages through which cold glycol can flow from a supply pipe 15 communicating with the delivery end of the chiller 11 to the discharge pipe 16 leading to the pump 12 and from thence to the chiller inlet; and the direct expansion coils 27 are interposed between the receiver 9 and the chiller 11 and are disposed adjacent to the insulated outer walls 26 of the compartments 5.

The food storage compartments may also be separated by an intervening space 18 disposed near the central plane of the hull 4 and within which most of the elements of the glycol cooling and refrigeration equipment may be confined, and insulated from the adjacent jacket 6 by a wall 17 as depicted in Fig. 3. The modified refrigerating system may also be provided with an oil separator 21 and in addition to the pipe lines 20, 22, 23, 24, 25, this system has a supply pipe line 28 connecting the coils 27 with the pipe line 25 and also has a discharge pipe line 29 for these coils communicating with the refrigerant circulating zone of the chiller 11. The modified system is moreover provided with suitable valves for properly controlling the flow of refrigerant and glycol therethrough, and while the refrigerating unit of this system is somewhat enlarged the glycol circulating portion of the system has been simplified.

When the modified system of Fig. 2 has been constructed and installed as described, and the various control valves have been properly set, its normal operation is as follows. After a supply of the sea food has been deposited within the compartments 5 through the hatches, the compressor 7 and the pump 12 should be operated to cause the compressor to constantly circulate refrigerant through the condenser 8, receiver 9, coils 27, chiller 11 and accumulator 10, and to simultaneously cause the pump 12 to constantly circulate cold glycol from the chiller 11 through the jackets 6, through pipe lines and pipes and in a manner similar to that described in connection with Fig. 1. The direct expansion coils 27 will then cooperate with the jackets 6 to effectively cool the commodity within the chambers 5, and the cooling effect afforded from each source may be varied by merely setting or manipulating the various control valves.

This combined direct and indirect cooling system also vastly reduces the obstructions within the compartments 5, as compared to the prior systems embodying only direct expansion coils within the storage spaces, and the combined system also facilitates removal of the sea food and cleaning of the compartments 5. In the modified system the shell of the chiller 11 will also serve as a catch basin for excess liquid refrigerant, and less refrigerant and simplified piping can be employed in the combined system, thus reducing the cost of installation and operation to a minimum and also eliminating danger of leakage to a great extent.

From the foregoing detailed description of the construction and operation of several systems embodying the present improvements, it should be apparent that the invention in fact provides a fish boat refrigeration system which is simple and compact in structure and highly effective and economical in operation. Both systems vastly reduce the danger of having volatile refrigerant escape into the commodity confining chambers and are also automatically operable with minimum power consumption after having been properly initially adjusted. By installing the systems within the hull 4 of the vessel as shown and described, the boat may be made more seaworthy without sacrificing fish storage space, and both systems facilitate removal of commodity and cleaning of the compartments 5. The invention has gone into highly satisfactory and successful use, and the systems are obviously operable with any suitable type of volatile refrigerant and anti-freeze solution.

It should be understood that it is not desired to limit this invention to the exact details of construction and operation of the systems herein specifically shown and described, for various modifications within the scope of the appended claims may occur to persons skilled in the art.

I claim:

1. A fishing boat comprising, a hull having separate sea food storage compartments extending along its opposite sides and also having an intervening space segregated from said compartments and disposed centrally above the keel of the hull, means forming jackets separating said space from said compartments and extending beneath the latter, means for circulating non-volatile anti-freeze solution through said jackets to cool commodity confined within said compartments, and refrigeration apparatus operable with volatile refrigerant to cool said solution and being confined within said space.

2. A fishing boat comprising, an elongated hull having separate sea food storage compartments extending along its opposite sides and also having an intervening space segregated and sealed from said compartments and extending centrally of the hull along and above the keel, means forming jackets separating said space from said compartments and which also extend upwardly along the bottom of the hull away from the keel, a pump for circulating non-volatile anti-freeze solution through said jackets to cool commodity confined within said compartments, and a refrigeration unit operable with volatile refrigerant to cool said solution and being confined within said space.

References Cited in the file of this patent

UNITED STATES PATENTS

| | | |
|---|---|---|
| 411,201 | Rich | Sept. 17, 1889 |
| 2,381,796 | Williams | Aug. 7, 1945 |
| 2,514,301 | Tenney | July 4, 1950 |
| 2,746,272 | Carpenter | May 22, 1956 |